United States Patent [19]
Iwaki

[11] Patent Number: 5,289,044
[45] Date of Patent: Feb. 22, 1994

[54] ELECTRONIC SYSTEM SWITCHABLE BETWEEN ITS PRIMARY CIRCUIT AND STANDBY CIRCUIT

[75] Inventor: Hiroyuki Iwaki, Kawasaki, Japan

[73] Assignee: Fujitsu Limited, Japan

[21] Appl. No.: 932,331

[22] Filed: Aug. 19, 1992

[30] Foreign Application Priority Data

Aug. 20, 1991 [JP] Japan .................... 3-207894

[51] Int. Cl.$^5$ ................................ H02J 1/10
[52] U.S. Cl. ......................... 307/64; 307/35; 307/19; 307/31
[58] Field of Search ............ 307/219, 441, 243, 35, 307/31, 19; 328/104, 243; 323/272

[56] References Cited

U.S. PATENT DOCUMENTS 5,027,002  6/1991  Thornton .................... 307/35
5,122,726  6/1992  Elliot et al. ................ 323/272

Primary Examiner—A. D. Pellinen
Assistant Examiner—Aditya Krishnan
Attorney, Agent, or Firm—Welsh & Katz, Ltd.

[57] ABSTRACT

A switching system of the present invention is formed of two identical units. e.g. printed circuit board, the primary and the backup units W & P. Each unit has a switching circuit 1 such that upon receiving a first alarm signal generated due to a malfunction taking place in a main circuit 6(W) of the primary unit W, the switching circuit 1W of the primary unit transmits a second alarm signal $S_4(W)$ to switching circuit 1P of the standby unit P, then the switching circuit 1P of the standby circuit 1P enables an output of main circuit 6(P) on the standby unit as well as transmits a control signal $S_9(P)$ to disable an output of main circuit 6(W) of the primary unit. A plurality of the units may form a group so that two groups are in the relation of the primary and the backup. A first unit in the group collects the alarm in the own group and communicates with the first unit of the other group, so that the switching are carried out by the whole group. The switching circuit 1 may be further provided with a manual switching circuit, a switch-upon-extraction circuit which detects an extraction of the printed circuit board from the upper system, and/or a compulsive switching circuit.

7 Claims, 14 Drawing Sheets

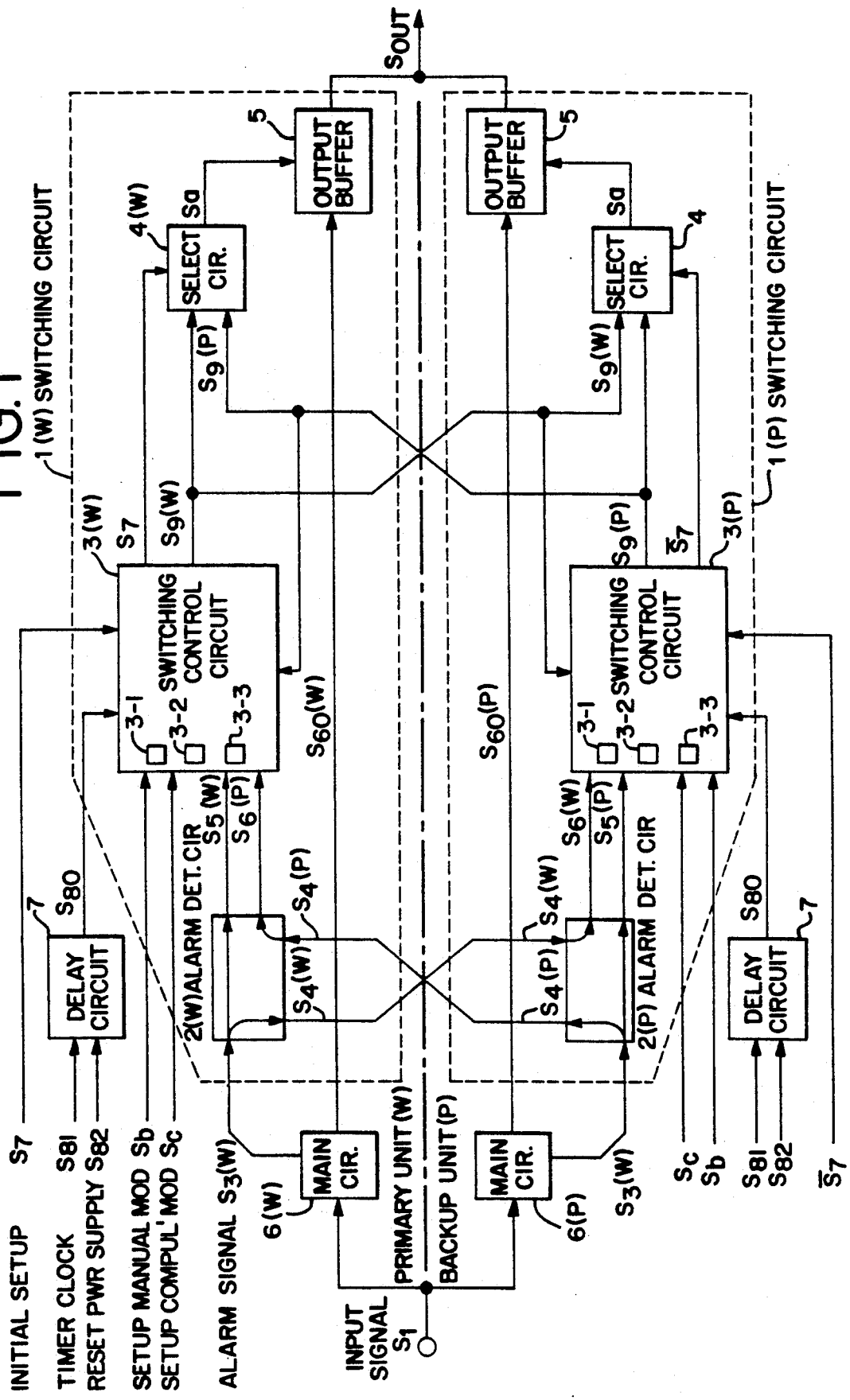
FIG. I

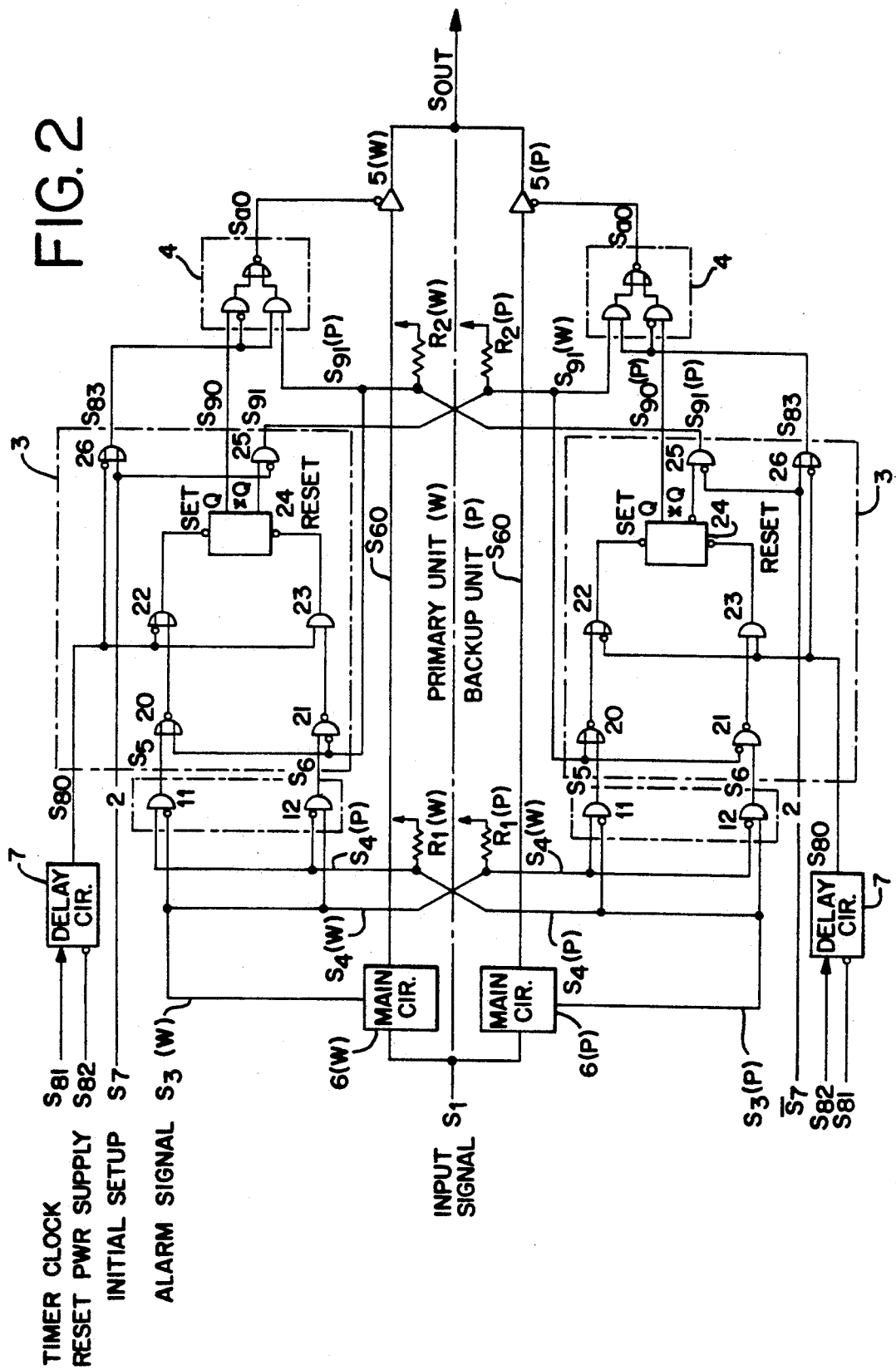

FIG. 3    INITIAL SETUP AFTER THE POWER IS SUPPLIED

| UNIT EXISTENCE | | UNIT SELECTION | |
|---|---|---|---|
| PRIMARY | BACKUP | PRIMARY | BACKUP |
| ◎ | ◎ | ○ | Z |
| ◎ | X | ○ | — |
| X | ◎ | — | ○ |

◎: UNIT EXISTS    ○: SELECTED
X: NO UNIT EXISTS    Z: NOT SELECTED

FIG. 4    AUTOMATIC SWITCHING MODE

| UNIT EXTRACT ALARM | | ALARM SIGNAL | | UNIT SELECTION | |
|---|---|---|---|---|---|
| PRIMARY $S_{91}(W)$ | STANDBY $S_{91}(P)$ | PRIMARY $S_4(W)$ | STANDBY $S_4(P)$ | PRIMARY | STANDBY |
| L | L | L | L | HELD | HELD |
| L | L | H | L | Z | ○ |
| L | L | L | H | ○ | Z |
| L | L | H | H | HELD | HELD |
| H | L | H | L | — | ○ |
| H | L | H | H | — | ○ |
| L | H | L | H | ○ | — |
| L | H | H | H | ○ | — |

L: UNIT EXISTS    H: ALARMING    ○: SELECTED
H: UNIT EXTR. ALRM    L: NON-ALARMING    Z: NOT SELECTED

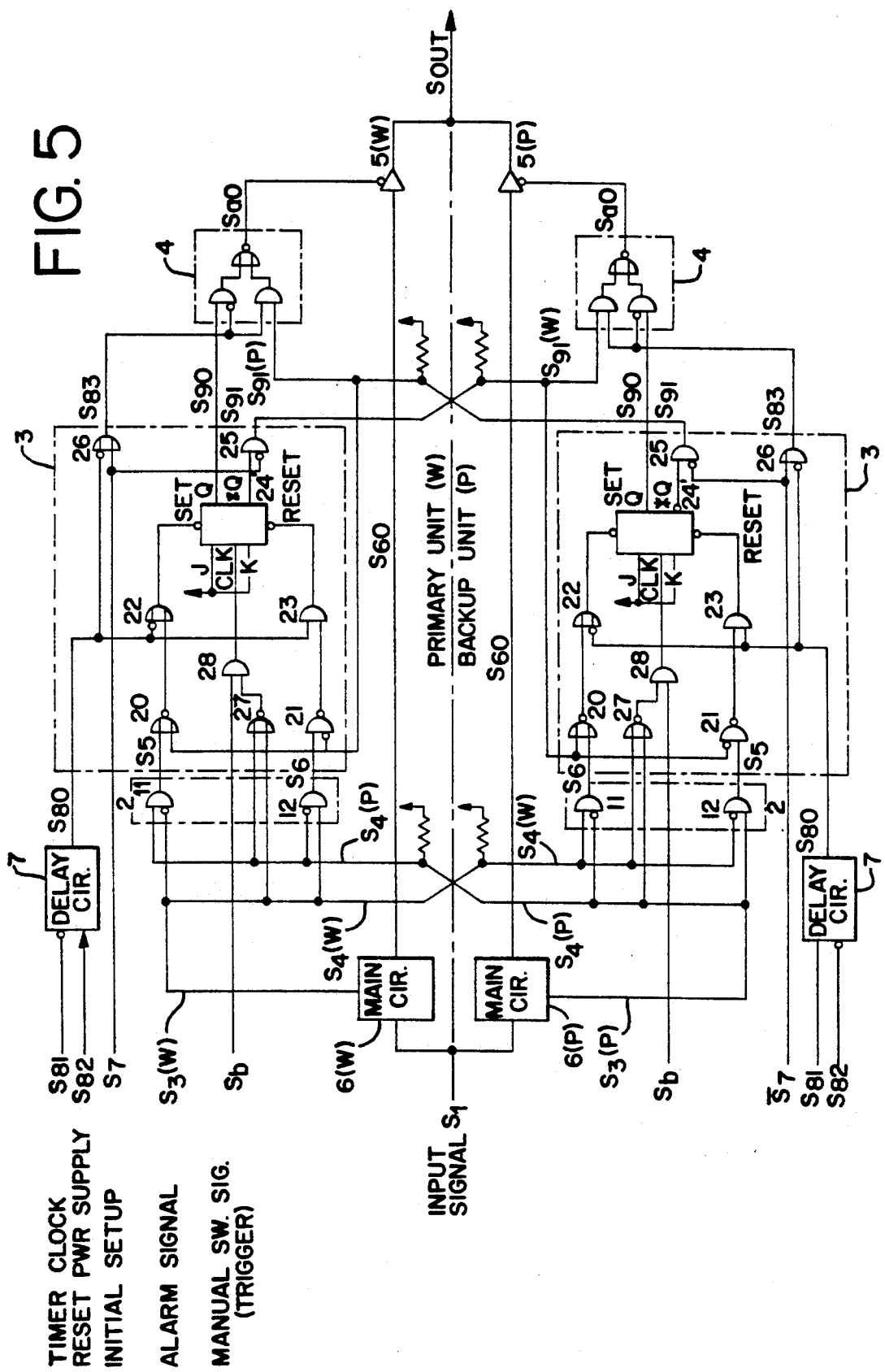

FIG. 6

MANUAL SWITCHING MODE (S_b: H)

| UNIT EXTR. ALARM | | UNIT ALARM | | MANUAL SWITCHING SIGNAL | UNIT SELECTION | |
|---|---|---|---|---|---|---|
| PRIMARY $S_{91}(W)$ | STANDBY $S_{91}(P)$ | PRIMARY $S_4(W)$ | STANDBY $S_4(P)$ | $S_b(P)$ | PRIMARY | STANDBY |
| L | L | L | L |  | HELD | HELD |
| L | L | L | L | ↑ | TOGGLE | TOGGLE |
| L | L | H | L |  | Z | ○ |
| L | L | H | L | ↑ | Z | ○ |
| L | L | L | H |  | ○ | Z |
| L | L | L | H | ↑ | ○ | Z |
| L | L | H | H |  | HELD | HELD |
| L | L | H | H | ↑ | HELD | HELD |
| H | L | H | L |  | — | ○ |
| H | L | H | L | ↑ | — | ○ |
| H | L | H | H |  | — | ○ |
| H | L | H | H | ↑ | — | ○ |
| L | H | L | H |  | ○ | — |
| L | H | L | H | ↑ | ○ | — |
| L | H | H | H |  | ○ | — |
| L | H | H | H | ↑ | ○ | — |

L: UNIT EXISTS  H: ALARMING  ↑: INVERT  ○: SELECTED
H: UNIT EXTR. ALRM  L: NON ALARMING  BLANK: HELD  Z: NOT SELECTED

FIG. 9

COMPULSIVE SWITCHING MODE ($S_{bO}$:L ; $S_{cO}$:H)

| UNIT EXTRCT. ALRM | | UNIT ALARM | | COMPULSIVE UNIT SELECTION SIGNAL | | UNIT SELECTION | |
|---|---|---|---|---|---|---|---|
| PRIMARY $S_{91}$(W) | STANDBY $S_{91}$(P) | PRIMARY $S_4$(W) | STANDBY $S_4$(P) | $S_{c1}$ | $S_{c2}$ | PRIMARY | STANDBY |
| L | L | L | L | H | L | ○ | Z |
| | | | | L | H | Z | ○ |
| | | H | L | H | L | ○ | Z |
| | | | | L | H | Z | ○ |
| | | L | H | H | L | ○ | Z |
| | | | | L | H | Z | ○ |
| | | H | H | H | L | ○ | Z |
| | | | | L | H | Z | ○ |
| H | L | H | L | H | L | ○ | Z |
| | | | | L | H | — | ○ |
| | | H | H | H | L | ○ | Z |
| | | | | L | H | — | ○ |
| L | H | L | H | H | L | ○ | — |
| | | | | L | H | Z | ○ |
| | | H | H | H | L | ○ | — |
| | | | | L | H | Z | ○ |

| L: UNIT EXISTS | H: ALARMING | | | ○: ENABL. MAIN CIR. |
| H: UNIT EXTR ALRM | L: NON ALARMING | | | Z : DISABLE M. CIR. |

ELECTRONIC SYSTEM SWITCHABLE BETWEEN ITS PRIMARY CIRCUIT AND STANDBY CIRCUIT

BACKGROUND OF THE INVENTION

1. Field of the Invention

This invention relates to an automatic selection system of two electronic circuits, a primary unit and a standby unit, initiated by a malfunction-alarming signal from one of them.

2. Description of the Related Arts

In a prior art switching system between its primary circuit and standby circuit, a control circuit is provided independently from the two circuits so as to transmit a switching instruction to both of the circuits upon receiving an alarm signal generated by one of the circuits. Recently in the control circuit a small data processor called a micro processor unit (MPU) is preferably employed to judge the alarm signal and then transmit the switching instruction to the two circuits.

In the prior art control circuit employing MPU is advantageous in that the conditions in judging the alarm and in the switching instruction can be easily modified by the program set in the MPU. However, there is a problem in that the MPU collecting various data takes them a considerably long time, for example 50 ms, to process them. Accordingly, the delay in switching the circuits causes loss of the data or discontinuation of clock signals.

SUMMARY OF THE INVENTION

It is a general object of the invention to provide a simple switching system to automatically and quickly switch a primary circuit to a standby circuit when a malfunction, i.e. a defect, takes place in the primary circuit in operation.

A switching system of the present invention is formed of two identical units, the primary and the backup units, e.g. printed circuit boards. Each unit has a switching circuit 1 such that upon receiving a first alarm signal $S_3(W)$ generated due to a malfunction taking place in a main circuit $6(W)$ of the primary unit W, the switching circuit 1W of the primary unit transmits a second alarm signal $S_4(W)$ to switching circuit 1P of the standby unit P, then the switching circuit 1P of the standby circuit 1P enables an output of a main circuit $6(P)$ on the standby unit as well as transmits a control signal $S_9(P)$ to disable an output of main circuit $6(W)$ of the primary unit. The switching circuit 1 typically comprises an alarm detection circuit 2, a switching control circuit 3, a selecting circuit 4 and a buffer circuit 5 serially connected to an output terminal of the main circuit 6.

In the present invention the selection of outputs of main circuits is always carried out by switching circuit $3(P)$ of the standby unit may P. Initial setup, i.e. which unit be the primary in operation or the backup, is determined by an initial set up signal $S_7$ which selects selecting circuit 4.

An alarm detection circuit 2 monitors an alarm signal from either of the two units. Upon receiving an alarm signal $S_3 (W)$ which indicates a malfunction of main circuit $6(W)$ of the own unit W an alarm detection circuit $2(W)$ of the primary unit W transmits to its own switching circuit 3W an alarm signal $S_5(W)$ and concurrently an alarm signal $S_4(W)$ to alarm detection circuit $2(P)$ of the opposite unit P. Upon receiving an alarm signal $S_4 (P)$ which indicates a malfunction of main circuit $6(P)$ of the opposite unit P the alarm detection circuit $2(W)$ transmits to its own switching control circuit $3(W)$ an alarm signal $S_6(P)$.

The switching control circuit 3 functions such that in a normal state receiving no alarm signal, the signal $S_5$ does not actuate its switching control circuit 3 of each unit, whereby switching control circuit 3 does not select its own selection circuit 4 keeping its output buffer $5(W)$ non-conductive. However, upon receiving the alarm signal $S_6(W)$ of the opposite unit W the standby switching control circuit $3(P)$ transmits an instruction $S_9(P)$ to its selecting circuit $4(P)$ so as to make its output buffer $5(P)$ conductive, and concurrently transmits an instruction $S_9(P)$ to the opposite selecting circuit $4(W)$ so as to make the opposite output buffer $5(W)$ non-conductive. The signal $S_5(P)$ from the own main circuit $6(P)$ actuates the switching control circuit $3(P)$ so as to select the opposite selecting circuit $4(P)$ only when the switching control circuit is on standby.

An input signal $S_1$ including clock pulses is input in parallel to both the main circuits 6 of the primary and standby units. Output terminals of both the main circuits 6 are connected with each other so as to output an output signal $S_{out}$ to an upper system. Thus, the enabling/disabling of the output buffers 5 allows the selection of one of the output signals $S_{60}$ of main circuit 5 as the output signal $S_{out}$ of this system.

The switching control circuit 3 may be further provided with an input terminal to be controlled by a delay circuit 7. The switching circuit 1 may be further provided with a manual switching circuit 3-1 which allows manual selection of the main circuit 6 of the opposite unit, a switch-upon-extraction circuit 3-2 which selects the main circuit 6 of its opposite unit when the own printed circuit board is extracted from a connector engaged with the unit, or a compulsive switching circuit 3-3 which forces the selection of the main circuit 6 of the opposite unit. There may be provided a pair of groups, as a primary group and a standby group, each of which has a plurality of blocks each of which is formed with the main circuit 6 and the switching circuit 6.

When the printed circuit board of primary unit W is extracted from a connector installed in the upper system, the switching control circuit $3(P)$ of the standby unit detects this fact so that the output buffer $5(P)$ of the standby unit is enabled.

An alarm signal $S_4$ generated in a primary group $G(W)$, which has a plurality of blocks each including the main circuit 1 and the switching circuit 6, is input through a first block #1(W) of the primary group into a first block #1(P) of the standby group, as an alarm signal thereto. Upon receiving the alarm signal from the primary group a switching circuit $1(P)$ of the first block #1(P) of the standby group P transmits a signal $S_4$ to enable all the buffers $5(P)$ of its own group, and concurrently transmits a signal $S_9(P)$ to disable all the buffers $5(W)$ of the primary group.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 1 schematically illustrates a principle block diagram of the present invention;

FIG. 2 schematically illustrates a circuit diagram of the first preferred embodiment of the present invention;

FIG. 3 is a table showing the initial setup after the power is supplied;

FIG. 4 is a truth table of automatic switching mode of the first preferred embodiment;

Figure 7:
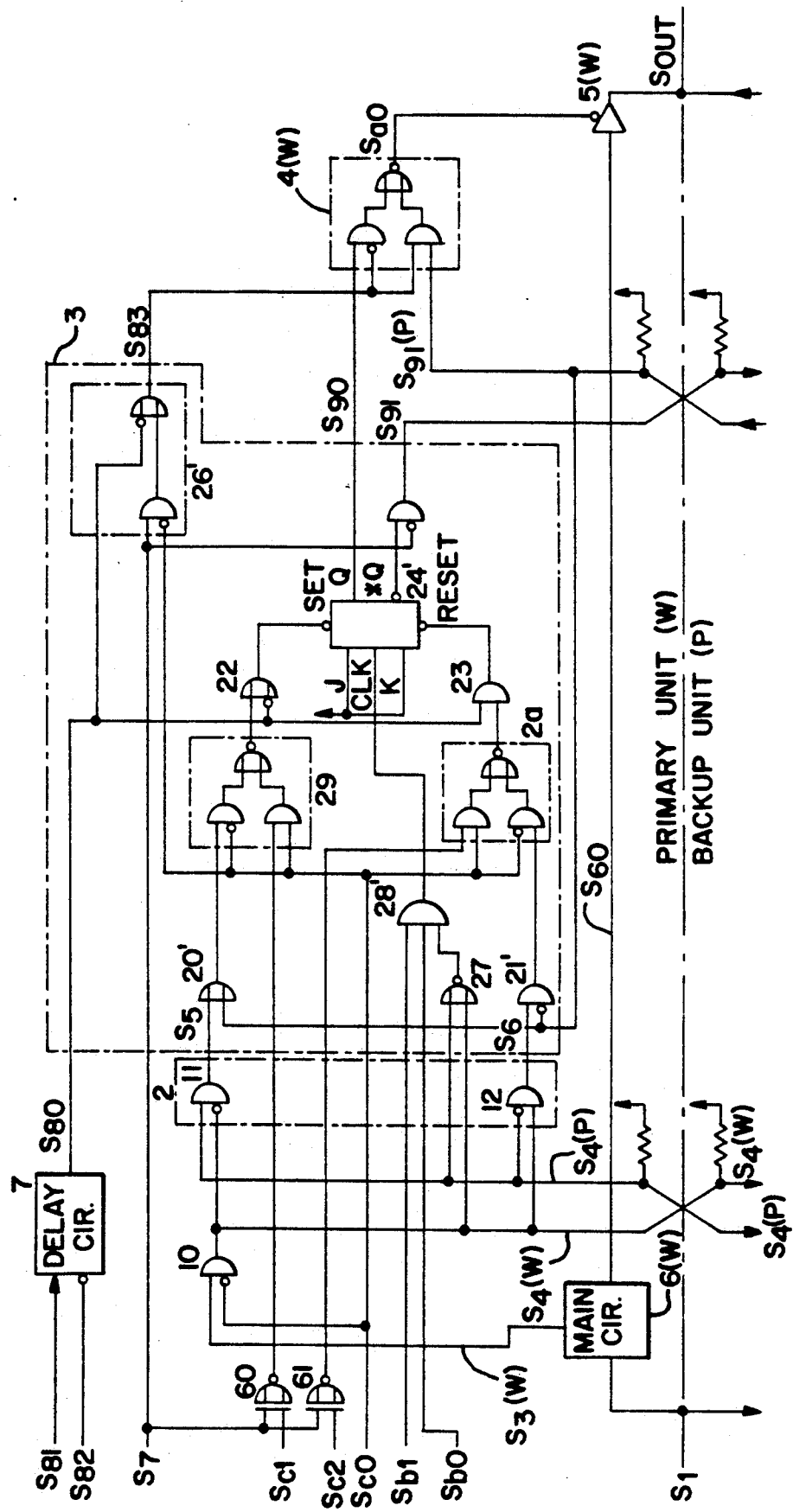
Figure 8:
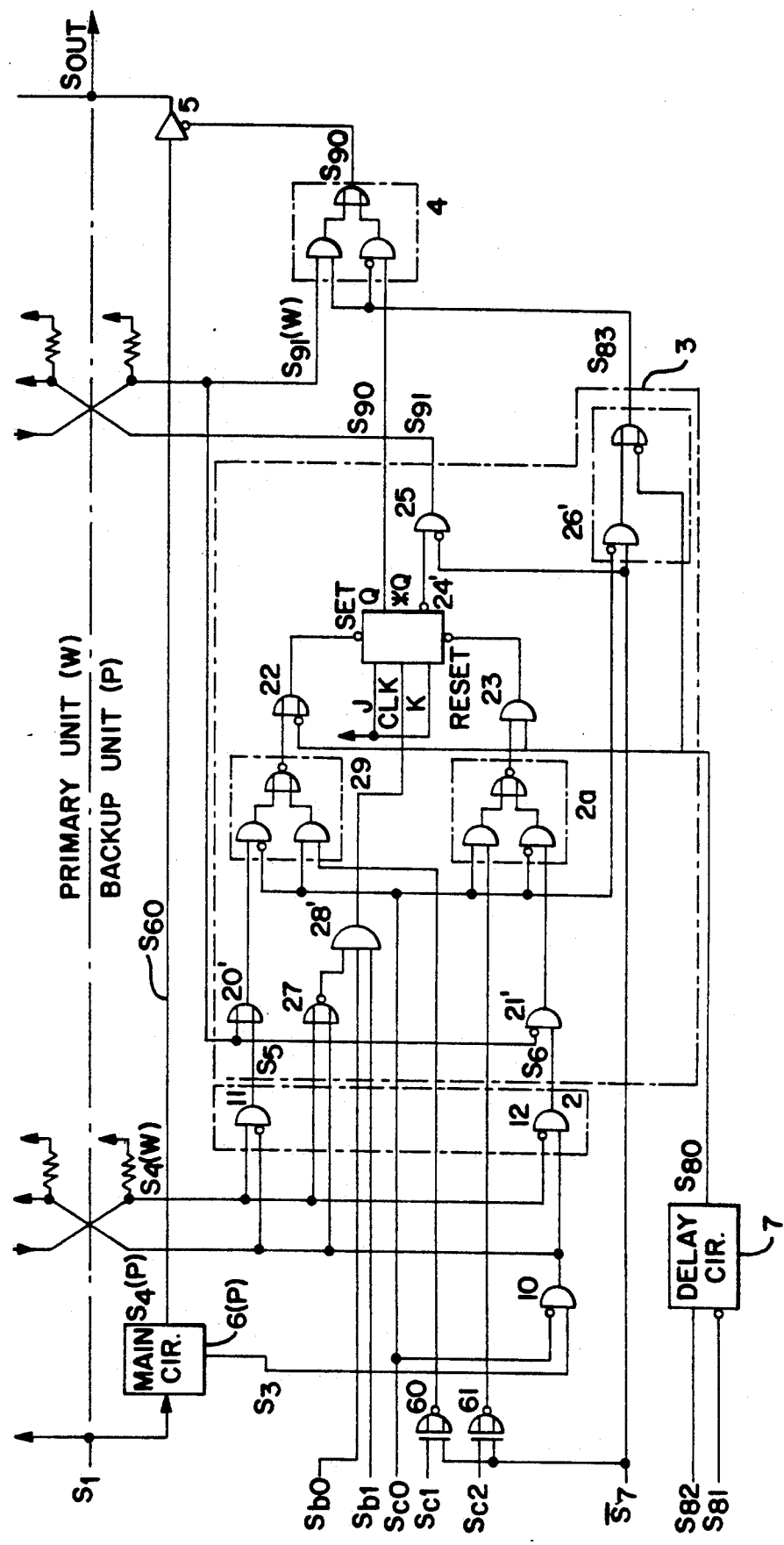
Figure 10:
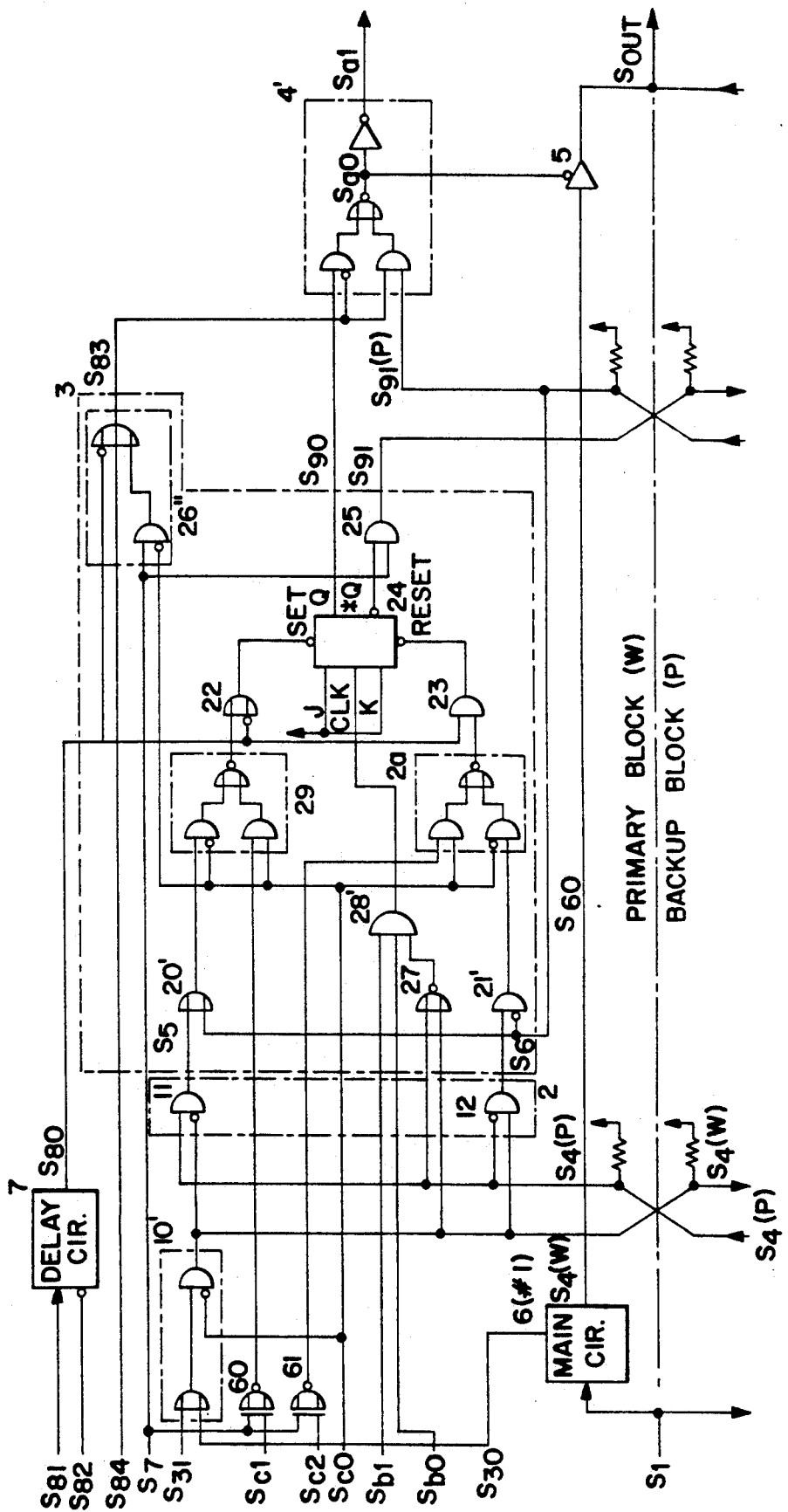
Figure 11:
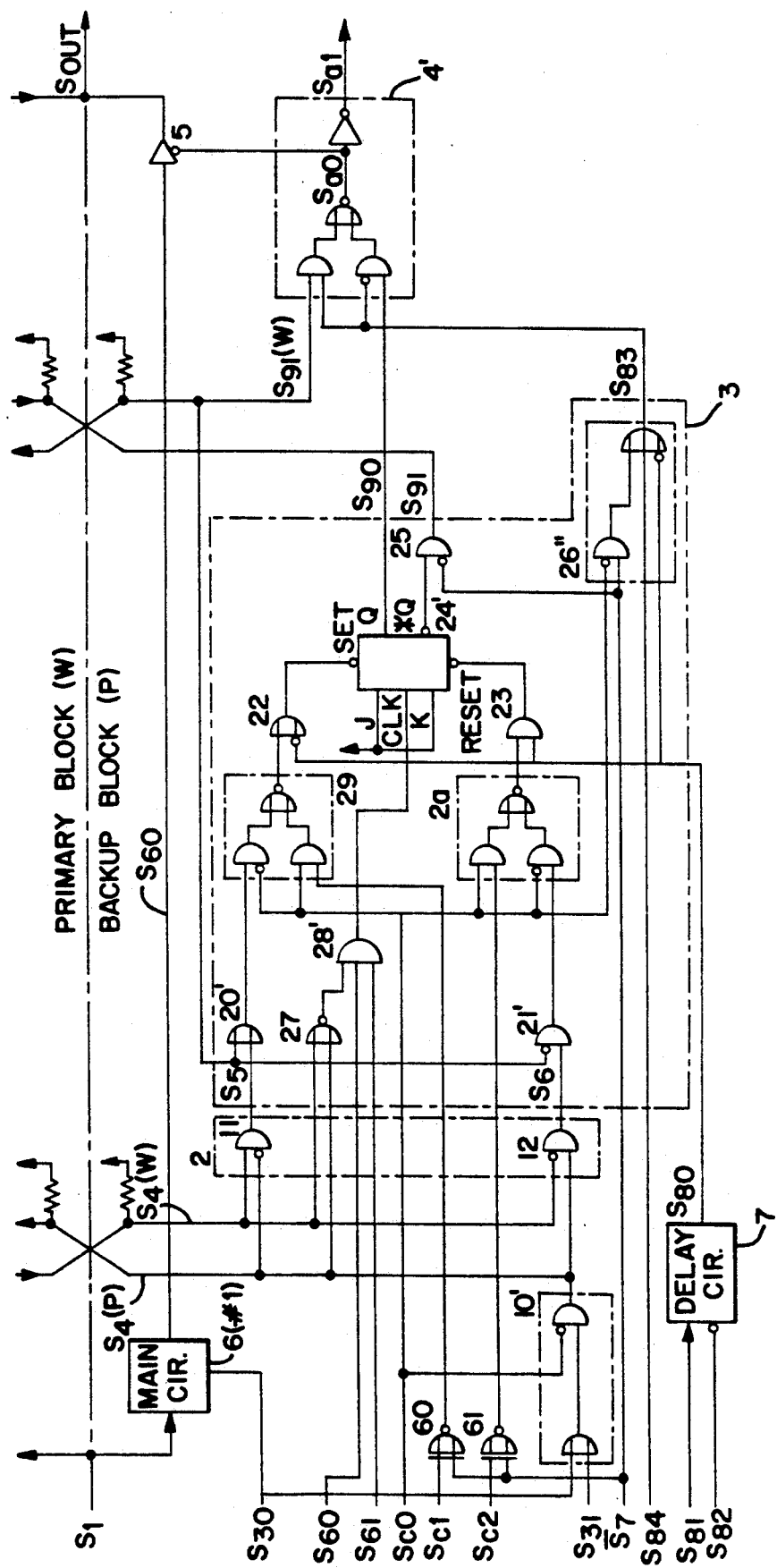
Figure 12:
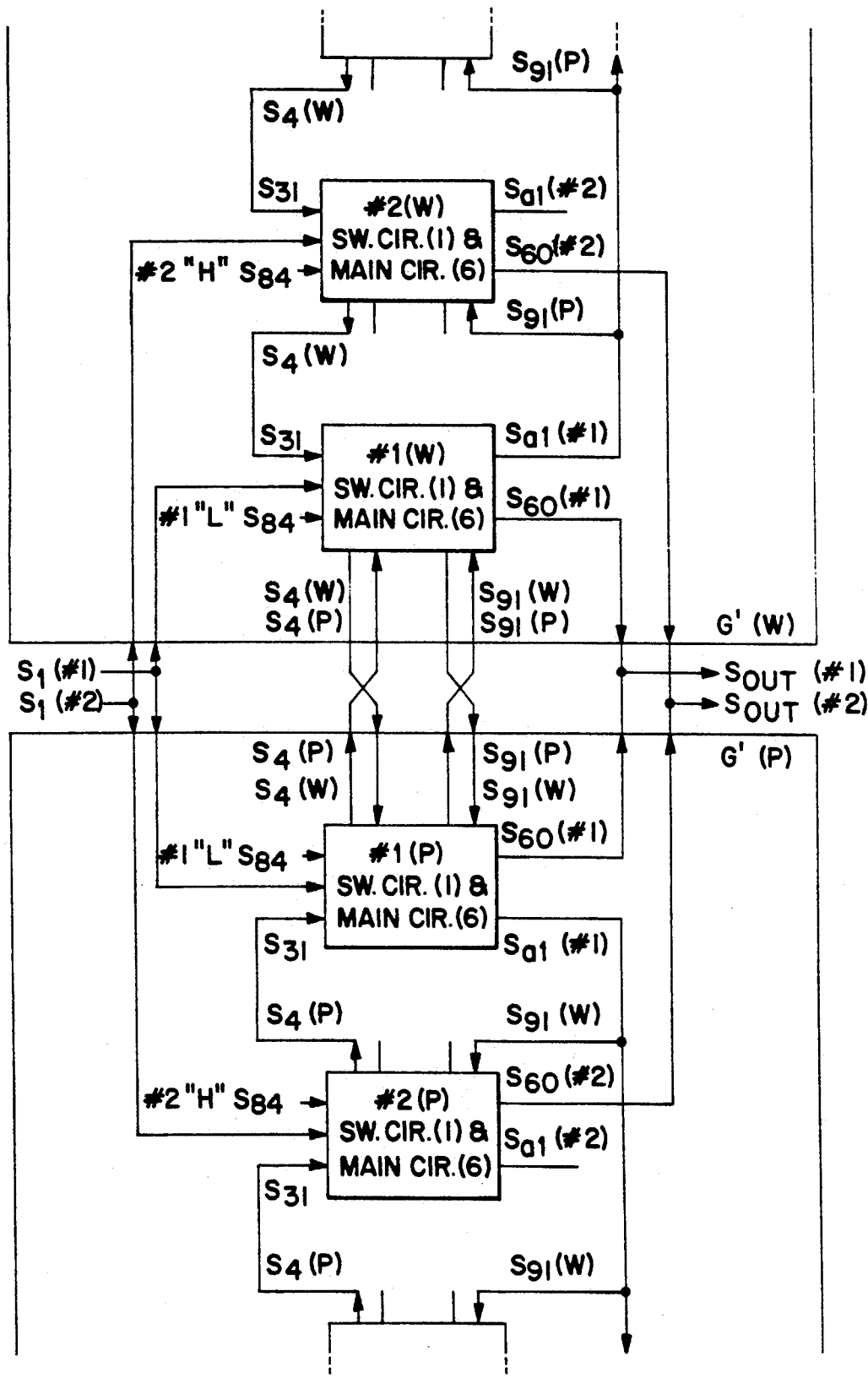
Figure 13:
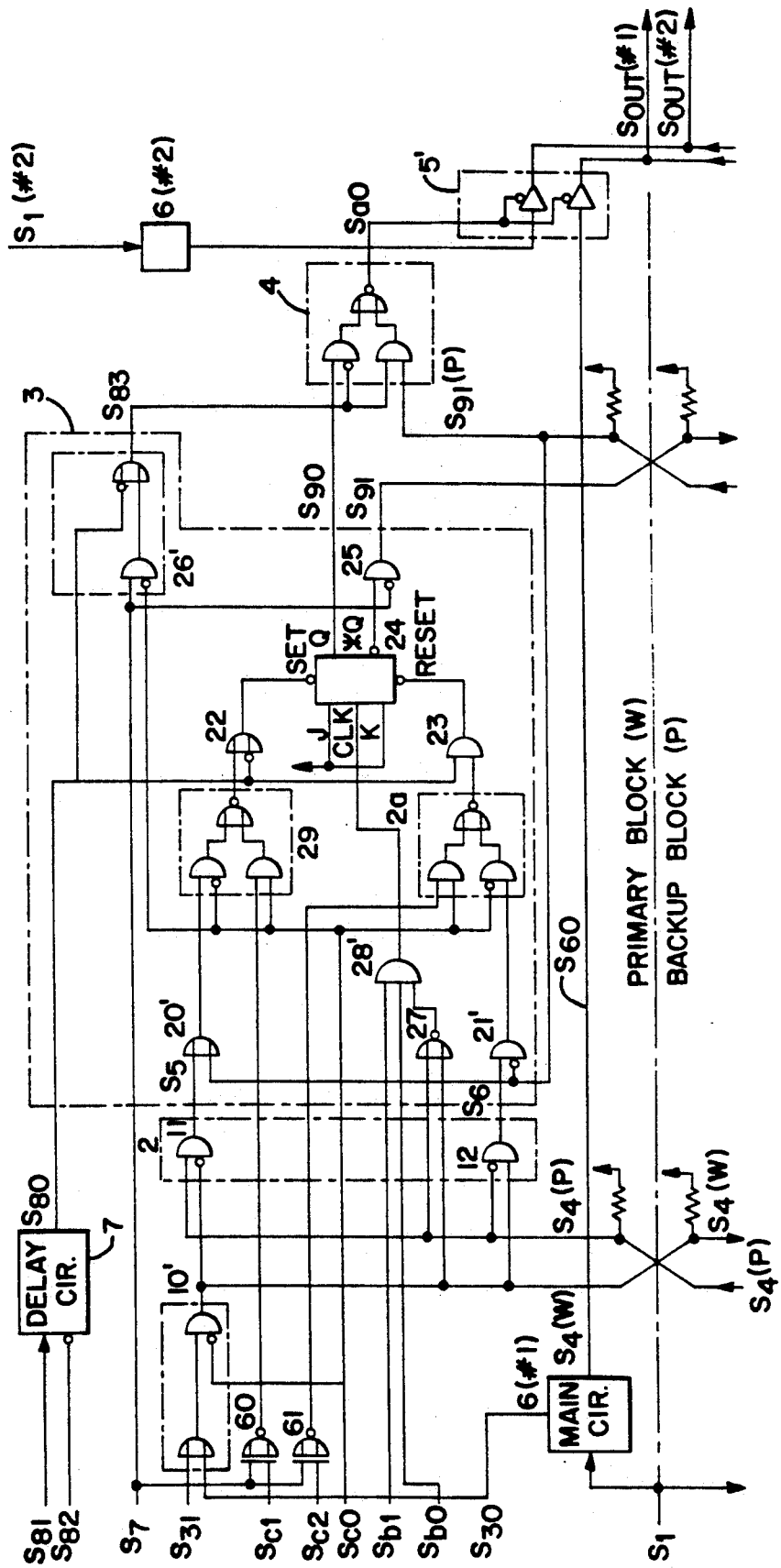
Figure 14:
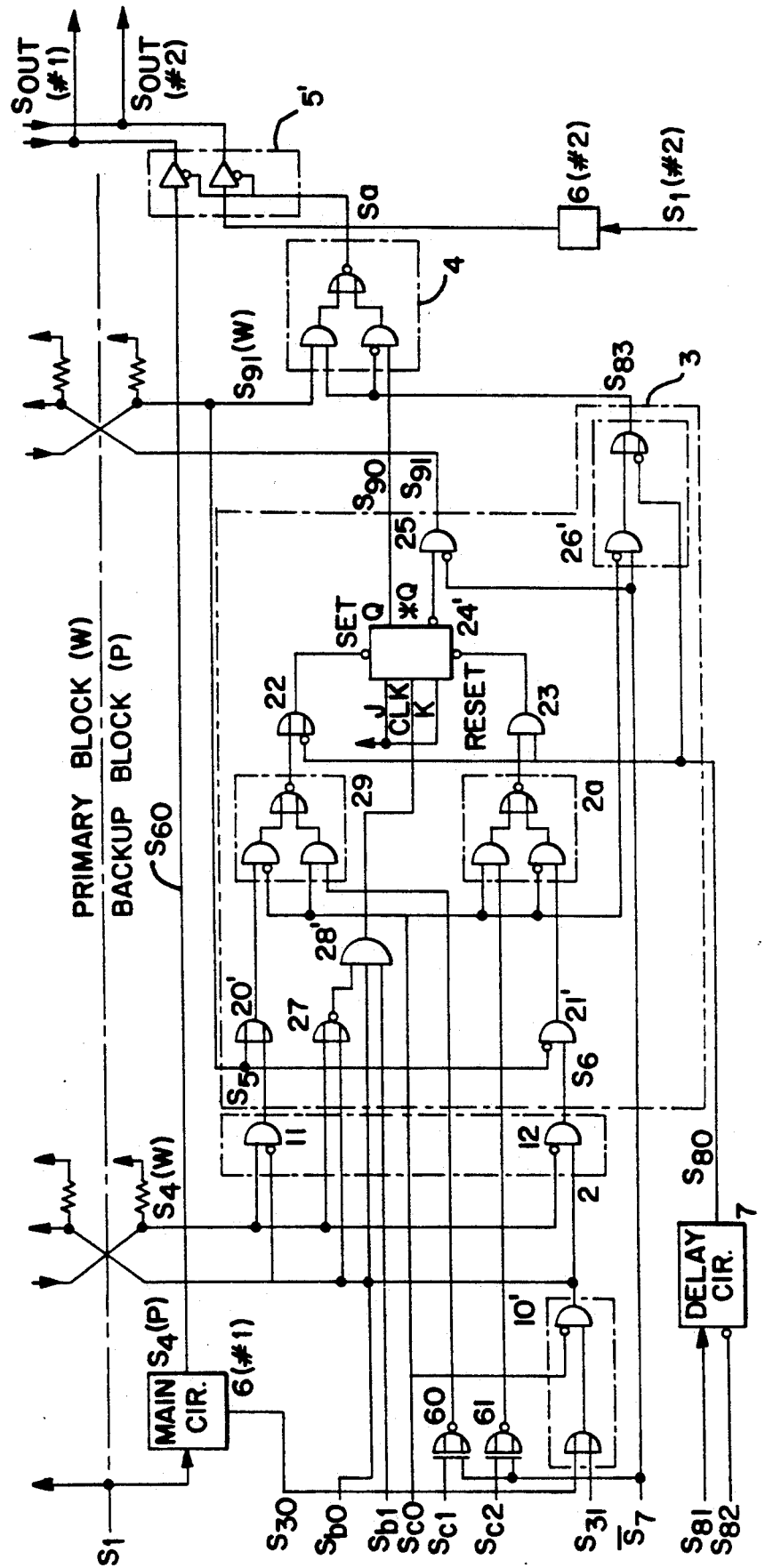

FIG. 5 schematically illustrates a circuit diagram of the second preferred embodiment of the present invention;

FIG. 6 is a truth table of manual switching mode of the second preferred embodiment;

FIG. 7 schematically illustrates a first half of a circuit diagram of the third preferred embodiment of the present invention;

FIG. 8 schematically illustrates a second half of the circuit diagram of the third preferred embodiment of the present invention;

FIG. 9 is a truth table of compulsive switching mode of the third preferred embodiment;

FIG. 10 schematically illustrates a first half of a circuit diagram of the fourth preferred embodiment of the present invention;

FIG. 11 schematically illustrates a second half of the circuit diagram of the fourth preferred embodiment of the present invention;

FIG. 12 schematically illustrates a block diagram showing the fourth preferred embodiment of the present invention;

FIG. 13 schematically illustrates a circuit diagram of a block of the fourth preferred embodiment of the present invention;

FIG. 14 schematically illustrates a block paired with the FIG. 13 block; and

Figure 15:
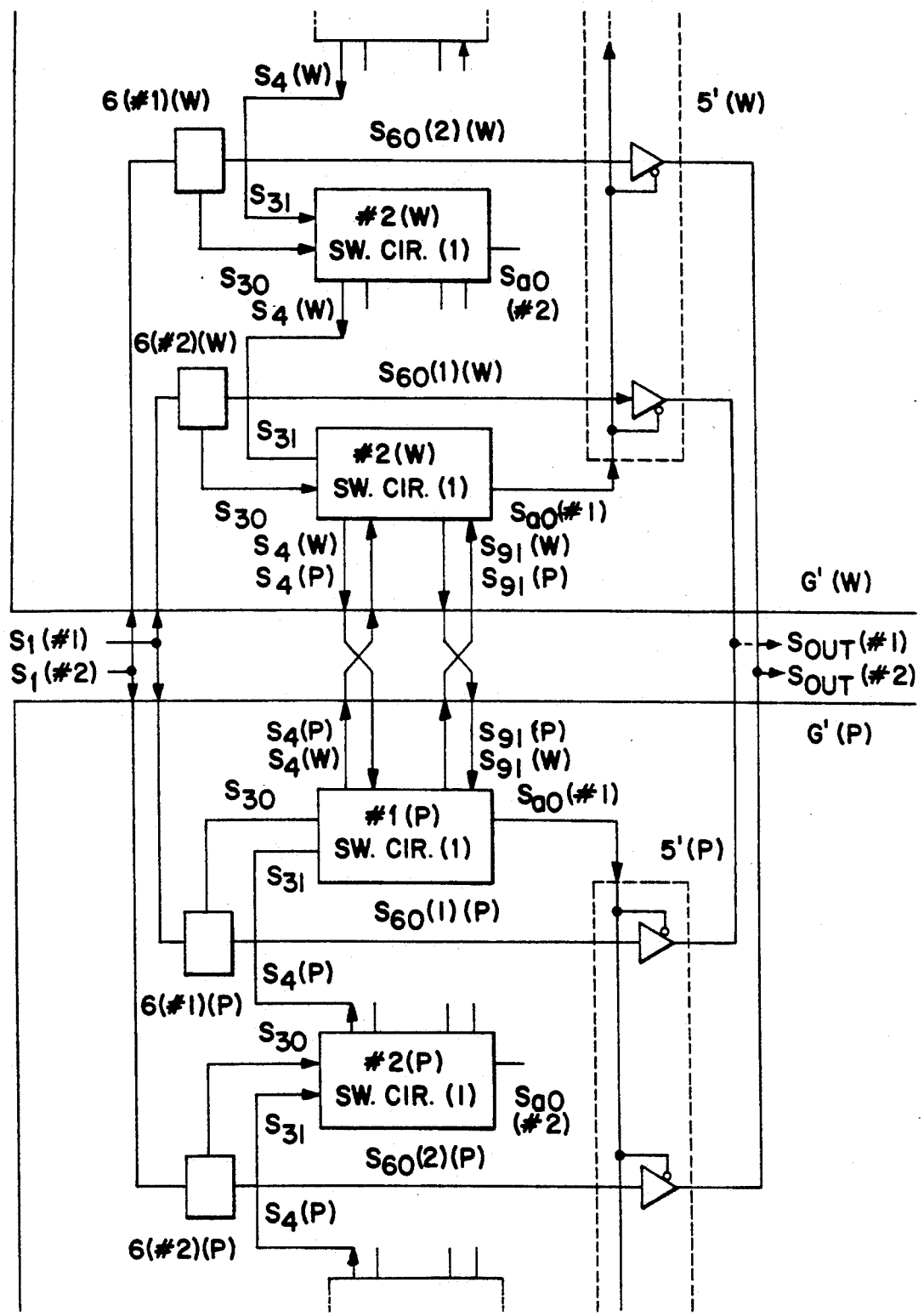

FIG. 15 schematically illustrates a block diagram showing the fifth preferred embodiment of the present invention.

DESCRIPTION OF THE PREFERRED EMBODIMENT

The switching system of primary and standby circuits according to the present invention is schematically shown by a block diagram in FIG. 1. The upper half and the lower half of FIG. 1 are identical to each other. For convenience sake in the below explanation a first printed circuit board W drawn on the upper half is nominated as a primary unit, as well as a second printed circuit board P drawn on the lower half is a standby unit. The alphabetic characters W and P of the suffix respectively indicate the primary (working) and the standby (i.e. protecting) and are written on the drawings only when they are necessary for the explanation. When unnecessary for the explanation the characters W and P are not written there because the parts are common for both the units. Same notation numerals are given to the same parts of both the units.

Referring to FIG. 2 to FIG. 3, a first preferred embodiment of the present invention is hereinafter described, where only an automatic switching function is provided.

A signal $S_{81}$ is a timer clock. A signal $S_{82}$ is to reset the power supply, such that the level is L for the reset, and H for the operation. In either case, when the power supply is started the signal $S_{82}$ becomes H and concurrently a delay circuit 7 constructed of a counter, which is not shown in the figures, starts to count the clock $S_{81}$. Upon counting a predetermined number, for example, nine, the delay circuit 7 outputs an H level of a reset signal $S_{80}$ to enable the switching control circuit 3. The circuit operation will be described later in detail. This procedure is to provide a time delay to wait recovery from an alarmed state caused from the discontinuation of the power supply, so that after the alarm signals are all recovered the switching control circuit 3 is made operative, because the recovery times of the alarm signals transmitted from the switching control circuit 3 after the application of the power supply vary widely.

A unit to which an H level of setup signal $S_7$ is input from the upper system is selected as a primary unit W, whose main circuit 6(W) is first kept in operation. Accordingly, a unit to which an L level of setup signal $S_7$ is input is a standby unit P to backup the primary unit in operation.

An input signal $S_1$ including clock pulses is always input in parallel to both of main circuits 6, such as an opto modulator, an opto amplifier, a radio-frequency modulator, a radio-frequency amplifier, a signal processor and so on. Each of output terminals of both the main circuits 6 outputting signal $S_{60}$ is connected to an input terminal of respective output buffer 5. Output terminals of both the buffers 5 are connected with each other so as to output an output signal $S_{out}$ of this switching system.

The switching of the primary unit, i.e. primary main circuit, to the backup unit, i.e. backup main circuit, according to the present invention is effective only when the backup unit P is existing. In other words, the function to switch the primary unit to the backup unit is unnecessary when the backup unit is not existing. Thus, the function of the invention to switch the primary unit to the backup unit is carried by the backup unit P.

When a malfunction takes place in the main circuit 6(W) main circuit 6(W) outputs H level of alarm signal $S_3(W)$.

An AND gate 11(P) of the backup unit P, upon receiving an alarm signal $S_4(W)$, i.e. $S_3(W)$, from the opposite unit W, i.e. the primary unit, outputs an H level of a signal $S_5(P)$ if receiving inversely an L level of alarm signal $S_3(P)$ of the own main circuit 6(P). An AND gate 12(P) of the backup unit P, upon inversely receiving an L level of, in other words none of, alarm signal $S_4(W)$ from the opposite main circuit 6(W), as well as an H level of an alarm signal $S_6(P)$ of own main circuit 6(P), outputs a H level of signal $S_6$, but outputs an L level when the opposite alarm signal $S_4(W)$ is H and alarm signal $S_3(P)$ from the main circuit 6(P) is L.

Gates 20 and 21 form a circuit to detect an extraction of the opposite printed circuit board out of its connector, which is not shown in the figure. On the primary unit W, an output signal $S_{91}(W)$ of its gate 25(W) is at an L level due to H of the setup signal $S_7$. When the primary printed circuit board W is extracted from the connector, the signal $S_{91}(W)$ input to gate 20(P) is pulled up via a resistor $R_2(P)$ to an H level of the power supply voltage. Thus, in an ordinary operation the gates 20(P) and 21(P) invert the outputs of gates 11(P) and 12(P), respectively. When the primary main circuit 6(W) outputs H of alarm signal $S_3(W)$, the alarm signal $S_4(W)$ is inverted by gate 20(P) so as to output L, as well as gate 21(P) so as to output H. Thus, upon a malfunction or extraction of the opposite (primary) unit the inverted output of gate 20(P) becomes L, however the output of gate 20 becomes H upon a malfunction of the main circuit 6(P). The inverted output of gate 21 upon the malfunction of the main circuit 6(P) becomes L, but becomes H upon a malfunction or extraction of the opposite unit.

Gates 22 and 23 form a circuit for initial setup after a power supply application. Each of gates 22 and 23 is enabled after a predetermined period given by delay circuit 7. During the reset period the output $S_{80}$ of delay circuit 7 is at an L level, then gate 22 outputs H and gates 23 outputs L. After the reset period both gates 22 and 23 respectively output the outputs of gate 20 and 21 as they are. The outputs of gates 22 and 23 are inversely input to a set terminal and a reset terminal of a flip-flop 24, respectively. One of the output buffers 5(W)/5(P) is selected by setting or resetting the flip-flop 24. That is, when a malfunction or an extraction of the printed circuit board takes place on the opposite unit the flip-flop 24 is set so as to make its Q output $S_{90}$ H; as well as when alarm signal $S_3$ is generated in the unit the flip-flop 24 is reset so as to make the inverted output denoted with *Q H. On the other hand, the selecting circuit 4(W) of the primary unit does not accept signal $S_{90}$(W) due to H of signal $S_{83}$(W), but accepts signal $S_{91}$(P) from the backup unit. The selecting circuit 4(P) of the backup unit does not accept signal $S_{90}$(W) due to L of signal $S_{83}$(P), but accepts signal $S_{91}$(P) from the backup unit. Thus, the backup unit determines the selection of the two selecting circuits 4.

Output signal $S_{ao}$ of thus elected selecting circuit 4 controls its buffer circuit 5 by making the buffer circuit conductive or a high-impedance, i.e. non-conductive, state indicated with Z in the truth table shown in FIGS. 3 and 4. Buffer 5 at the conductive state allows the output signal $S_{60}$ of the main circuit 6 to be output as the output signal $S_{out}$ of this switching system. Thus, the selecting circuit 4 selects its own buffer 5 according to signal $S_{91}$ from the opposite unit. As shown in truth table of FIG. 4, when neither of the units outputs the alarm signal the immediately previous state is kept on; when either of the units outputs the alarm signal the buffer on a unit having no alarm is selected; and when both of the units output the alarm signals the buffer selected at the immediately previous step is kept to be selected.

Referring to a circuit diagram on FIG. 5 and a truth table on FIG. 6, a second preferred embodiment of the present invention is hereinafter described, where a manual switching circuit 3-1 is added to the switching control circuit 3.

The manual switching circuit 3-1 is constructed with gates 27 and 28. Manual switching mode is effective only when neither of the two units has alarm signal. The switching between the primary and the backup units is controlled by inputting a manual switching signal $S_b$ to the manual switching circuit 3-1 on the backup unit setup by L level of the setup signal $S_7$. The manual switching signal $S_b$ is of a trigger signal, and is allowed to be input to the clock terminal of flip-flop 24' only when the output of gate 27 is H due to no alarms on both the units. This trigger signal is illustrated with an upward arrow in the truth table. Flip-flop 24' is of so-called an edge-triggered bi-stable circuit, where the J and K terminals are fixed to the power supply voltage. Flip-flop 24' is inverted by the leading edge of the input trigger signal so as to switch the units which have been respectively set primary and backup. If alarm signal $S_3$ is generated in either one of the units, the output of gate 27 becomes L so that the manual switching signal Sb is prevented by gate 28, and the mode is returned back to the automatic switching mode of the first preferred embodiment. Then, the operation is the same as described in the first preferred embodiment. When no more alarm signal is existing, the manual operation can be revived by inputting the manual switching signal $S_b$. The manual switching mode is initiated each time the trigger signal $S_b$ is generated by operating a switch (not drawn in the figure) by a human operator.

Referring to a circuit diagram on FIG. 7 and a truth table on FIG. 9, a third preferred embodiment of the present invention is hereinafter described, where a compulsive switching circuit 3-2 is further added to the switching circuit 3.

The compulsive switching circuit 3-2 is constructed of gates 60 and 61, gates 29 and 2a and gate 26' added to gate 26. In the compulsive switching mode, no switching takes place to the other unit even if one of the units is extracted, because each unit is independently controlled. The compulsive switching mode is selected by H level of a compulsive switching mode signal $S_{co}$, and is not-selected by its L level. Compulsive switching mode signals $S_{c1}$ and $S_{c2}$ select the primary unit by their H and L levels, respectively; as well as select the backup unit by their L and H levels, respectively; however, their "H and H" combination is inhibited because "H and H" combination is to select both the units. Their "L and L" combination is also inhibited because the L outputs of gates 60(W) and 61(P) try to concurrently set and reset the flip-flop 24'. Gates 60(W) and 61(W) on the primary unit, each enabled by initial setup signal $S_7$, allow compulsive switching signals $S_{c1}$ and $S_{c2}$ to pass therethrough. Gates 60(P) and 61(P) on the backup unit, each disabled by initial setup signal $S_7$, allow compulsive switching signals $S_{c1}$ and $S_{c2}$ to output their inverted signals. When the compulsive switching mode signal $S_{co}$ is H, gates 29 and 2a select gates 22 and 23 so as to output their inverted signals. When the compulsive switching mode signal $S_{co}$ is H, gate 26' outputs L level of signal $S_{83}$; therefore, the selecting circuit 4 allow signal $S_{90}$ output from flip-flop 24' to pass therethrough so as to output its inverted signal, regardless to the level of signal $S_{91}$ given from the opposite unit. Consequently, buffer 5 is enabled so as to allow the output signal of the own main circuit to pass therethrough. Then, due to L level of signal $S_{83}$ output from each of the primary and backup units each of its Q outputs $S_{90}$ from the own flip-flop 24' is received by buffer 5 regardless of signal $S_{91}$ output from the opposite unit. When both of $S_{co}$ and $S_{bo}$ are of L level, the automatic switching operation described in the first preferred embodiment is carried out. When $S_{co}$ is L and the manual switching mode setup signal $S_{bo}$ is H, the manual switching operation described in the second preferred embodiment is carried out. Truth tables are not particularly shown because the operations are the same as those of FIG. 4 and FIG. 6, respectively.

Referring to a #1 block diagram on FIGS. 10 and 11 and a block diagram on FIG. 12, a fourth preferred embodiment of the present invention is hereinafter described, where the present invention is embodied to switch a plurality of main circuit signals $S_{60}$. In FIG. 12, there are two groups, respectively formed of a plurality of blocks #1(W)–#n(W) and #1(P)–#n(P), where each block is formed of an IC (integrated circuit) package including the unit shown in FIGS. 10 and 11 having the main circuit 6 and switching circuit 1 which includes the circuits 2, 3, 4, etc. Each group is installed on a single printed circuit board, in symmetry in the relation of the primary (W) and the backup (P) to each other. Main circuits 6 in the blocks may be identical to or different from each other. Input terminals of the symmetrically paired blocks #m(W) and #m(P) are connected with each other, to which connection a signal $S_1(\#1)$-$S_1(\#n)$ is commonly input. Output terminals of the symmetrically paired blocks #m(W) and #m(P) are connected with each other, from which connection a signal $S_{60}$ from the selected one of main circuits 6 is output. The FIGS. 10 and 11 circuits are installed also on other blocks #2-#n than the first block #1; however, the output terminals of control signal $S_{91}$ and $S_{ao}$ are kept open without being connected to anything.

Signal processing of the switching operation between the primary and backup groups is carried out according to the operation described in the first to third preferred embodiments. The switching circuit is different in the fourth preferred embodiment from the FIG. 7 third preferred embodiment in that the gate circuit 10 is replaced with gate circuit 10', its gate circuit 26' with gate circuit 26", and the selecting circuit 4 with selecting circuit 4', respectively, and that a switch-effective signal $S_{84}$ and its input circuit are additionally provided. A signal $S_{30}$ is an alarm generated by the main circuit in the own block. A signal $S_{31}$ is an alarm output from other blocks in the group, i.e. the same printed circuit board. H level of signal $S_{bo}$ selects the manual switching mode. Signal $S_{b1}$ corresponds to the manual switching trigger signal in the second preferred embodiment. L level of the switch-effective signal $S_{84}$ is input to the first block #1 that is in charge of transmitting/receiving the signals to/from the opposite printed circuit board, while H level of the switch-effective signal $S_{84}$ is input to other blocks #2-#n that do not transmit/receive the signals to/from the opposite printed circuit board. Accordingly, only when the compulsive switching mode signal $S_{co}$ is H the output level of gate circuit 26" of both the primary and backup group is L. Generation of the switching signal in each block is carried out according to the first to third preferred embodiments. Main circuit 6(#m) that has a malfunction transmits an alarm signal $S_{30}$ to switching circuit 1 of its own m-th block, from which the alarm is output as $S_4$. The alarm signal $S_4$ is then input as an alarm signal $S_{31}$ to an adjacent block #m-1 to the first block #1. Thus, this alarm signal propagates via one by one block to arrive the first block #1. This signal is further input as an alarm signal $S_4(W)$ of the own group to a first block #1(P) on the opposite backup group (printed circuit board) G(P). Gate circuit 20' act as a circuit to collect an alarm signal generated in its own group. $S_{91}$-input terminals of all the blocks #2-#n than the first block #1 are input with $S_{a1}(\#1)$ signal in parallel from its first block #1. On the backup printed circuit board G(P) the switching circuit 1(P) receiving the alarm signal $S_4(W)$ from the primary group G(W) outputs its signal $S_{a1}(\#1)$ to enable all the buffers 5(P) of its own group as well as concurrently transmits L level of signal $S_{91}(P)$ to the first block #1(W) of the primary group so that the primary first block #1(W) outputs L level of its signal $S_{a1}W$), accordingly disable all primary selecting circuits 4'(W), accordingly disable the buffers 5, of other blocks than the first block #1(W). Thus, the alarm signals $S_4$ and $S_{91}$ to inform the switching between the primary and standby printed circuit 6 to the opposite printed circuit board are communicated only between the two first blocks #1(W) and #1(P) respectively of the two boards. None of other blocks #2-#n is communicated with corresponding one of the opposite printed circuit board. In other words, the alarm signal $S_4(\#m)$ is collected via the cascade connection with $S_{a1}(\#n-1)$ of the adjacent block to the first block #1 so as to be transmitted therefrom to the opposite first block #1. Thus, on any malfunction taking place in any block the printed circuit board carrying the block is switched to the opposite printed circuit board. On an extraction of either one of the printed circuit boards or on a compulsive selection of the printed circuit board, the switching is carried out between the two whole printed circuit boards G(W) and G(P). The system of the fourth preferred embodiment is advantageous in that, due to the plural numbers of main circuits installed on a single printed circuit board, when the printed circuit board is extracted from its connector due to a malfunction generated therein or for its servicing, the group is surely switched to the opposite group without increasing the number of the printed circuit boards for carrying the plural main circuits 6.

Referring to a #1 block diagram on FIGS. 13 and 14 and a block diagram on FIG. 15, a fifth preferred embodiment of the present invention is hereinafter described, where as a variation of the fourth preferred embodiment of the present invention a buffer 5' to enable/disable the signal $S_{60}$ output from the main circuit 6 is located outside the blocks. In FIG. 12 an alarm signal indicating a generation of malfunction in either main circuit 6(#m) is input as signal $S_{30}$ to the switching circuit 1 of the same block #m. On each of the two printed circuit boards, the signal $S_{ao}(\#1)$ output from selecting circuit 4 of the first block #1 is input in parallel to $S_{91}$ -input terminals of all other blocks #2-#n so that all the buffers 5' of the own printed circuit board are disabled. That is, in FIGS. 13 and 14 the outputs $S_{60}(\#1)$ and $S_{60}(\#2)$ respectively from two main circuits 6(#1) and 6(#2) of the first and second blocks are concurrently controlled so that the signals $S_{60}$ output from the main circuits are selected by one of the two whole printed circuit board to respectively output the signals $S_{out}(\#1)$ and $S_{out}(\#2)$. In FIG. 15, the signal communications between the blocks and between the two printed circuit boards are the same as those of the fourth preferred embodiment. There are employed the circuits of FIGS. 13 and 14 as well in other blocks than #1 block. However, the terminals of the control signals $S_{91}$ and $S_{ao}$ are kept open without connecting to any block of the opposite printed circuit board. In the fifth preferred embodiment all of the blocks can be formed of a single kind of LSI (large scale integrated circuit) so that the circuit design can be simple and easy, resulting in a reduction in the manufacturing cost.

Though in the fifth preferred embodiment there is described that main circuits 6 are installed outside the blocks, it is apparent that the present invention can be embodied so as to have main circuits installed within the blocks.

Thus, according to the present invention, when a malfunction takes place in a main circuit on a primary unit the primary unit can be so quickly switched to the backup unit that the loss of the signal of the main circuit or the loss of the clock signals are prevented. Moreover, the switching to the backup unit can be carried out either automatically, manually or compulsively. Further more, one of the units, i.e. printed circuit boards, supporting each other can be extracted from their upper system without paying particular attention for the extraction, so as to allow easy but reliable servicing of the main circuit. The circuit to control the unit-switching employs no microcomputer so as to advantageously accomplish the quick switching as well as the inexpensive circuit configuration.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications or equivalents may be resorted to, falling within the scope of the invention.

What I claim is:

1. A switching system comprising a first unit and a second standby unit, each unit having a main circuit (6), said main circuit outputting a first alarm signal when a malfunction takes place in said main circuit; a first one (6(W)) of said main circuits being in operation and a second one (6(P)) of said main circuits as a standby circuit to support said first main circuit (6(W)), circuit configuration of said two units being substantially identical to each other, the switching system further comprising:

a first switching circuit (1(W)) of the first unit, having a first alarm detection circuit, coupled to said first main circuit, for receiving said first alarm signal and for transmitting a second alarm signal (S4W) to a second switching circuit (1(P)) of the second standby unit (P) upon receiving the first alarm signal from said first main circuit (6(W)), said first switching circuit also having a first switching control circuit, coupled to said first alarm detection circuit and to a first selecting circuit, said first selecting circuit being coupled to a first buffer circuit that is serially coupled to an output from the first main circuit, said first switching control circuit being adapted for actuating said first selecting circuit to enable said first buffer circuit to pass said output in response to receiving an alarm signal from said second switching circuit, said second switching circuit (1(P)) of the second standby unit (P) having a second alarm detection circuit, coupled to said second main circuit, for receiving said second alarm signal and a third alarm signal from said second main circuit, said second switching circuit also having means for selecting the second main circuit (6(P)) of the second standby unit, said second switching circuit (1(P)) of the standby unit further having means for transmitting a control signal S9(P)) to disable said first buffer circuit of the first unit in response to receiving said second alarm signal.

2. A switching system as recited in claim 1, wherein said switching control circuit further comprises a manual switching circuit (3-1) for allowing manual selection of said main circuit (6) when neither of said first and third alarm signals are present, such that one of said first or second main circuit may be manually selected.

3. A switching system as recited in claim 1, wherein said first switching control circuit further comprises a switch-upon-extraction circuit (3-2) for detecting a disconnection of said first unit from an upper system including the two units so as to enable said second main circuit (6(P)) of the second unit (P) upon extraction of said first unit from a connector.

4. A switching system as recited in claim 1, wherein said first switching circuit (1(W)) further comprises a compulsive switching circuit (3-3) for allowing the compulsive selection of one of the main circuits (6).

5. A switching system as recited in claim 1, wherein a circuit combination is formed of said switching circuit (1(W)) and the main circuit (6), the system comprises:

a pair including a first group (G(W)) and a second group (G(P)), each having a plurality (n) of said circuit combinations; said first and second groups being in a relation of a primary group and a standby group;

wherein circuit connection is configured such that a first alarm signal (S3W)) generated from a main circuit in one of said circuit combinations in said first group (G(W) is transmitted to a switching circuit (1(W)) in a first circuit combination (#1(W)) of this group (W), and is then transmitted as a second alarm signal (S4W)) to a first circuit combination (#1(P)) in said second group; said switching circuit (1(P)) in said first circuit combination (#1(P)) further including means for enabling all of main circuits (#1(P)6-#n(P)6) in said second group as well as means for concurrently transmitting a control signal (S91(P)) to the switching circuit (1(W)) in said first circuit combination (#1(W)) in said first group so as to disable all of main circuits (#1(W)6-#n(W)6).

6. A switching system as recited in claim 5, wherein each of said switching circuits (1(W)) is formed of a common integrated-circuit.

7. A switching system as recited in claim 1 above wherein said second switching circuit is comprised of a second switching control circuit, coupled to said second alarm detection circuit and to a second selecting circuit, said second selecting circuit being coupled to a second buffer circuit that is serially coupled to an output from the second main circuit, said second switching control circuit being adapted for actuating said second selecting circuit to enable said second buffer circuit to pass said output in response to receiving an alarm signal from said first switching circuit.

* * * * *

UNITED STATES PATENT AND TRADEMARK OFFICE
CERTIFICATE OF CORRECTION

PATENT NO. : 5,289,044
DATED : February 22, 1994
INVENTOR(S) : Hiroyuki Iwaki

It is certified that error appears in the above-indentified patent and that said Letters Patent is hereby corrected as shown below:

```
Col. 1, line 55, delete "may".
Column 1, line 56, "may" should be inserted after --unit--.
Column 2, line 34, delete "its" and insert --the--.
Column 2, line 34, delete "the" and insert --its--.
Column 4, line 44, delete "own".
Column 4, line 56, delete "an".
Column 4, line 64, delete "20" and insert --20(P)--.
Column 6, line 43, delete "units" and insert --units,--.
Column 6, line 43, delete "its" and insert --the--.
Column 6, line 44, delete "the" and insert --its--.
Column 7, line 17, delete "its" and insert --the--.
Column 7, line 22, delete "the" and insert --its--.
Column 7, line 57, delete "W)" and insert --(W)--.
Column 10, line 27, delete "(G(W)" and insert --(G(W))--.
```

Signed and Sealed this

Third Day of October, 1995

BRUCE LEHMAN

*Attest:*

*Attesting Officer*          Commissioner of Patents and Trademarks